United States Patent
Kotzin et al.

(10) Patent No.: US 7,688,835 B2
(45) Date of Patent: *Mar. 30, 2010

(54) DYNAMIC WIRELESS BACKHAUL

(75) Inventors: Michael D. Kotzin, Buffalo Grove, IL (US); Hao Bi, Lake Zurich, IL (US); Brian K. Classon, Palatine, IL (US); Sivakumar Muthuswamy, Tower Lakes, IL (US); Paul D. Steinberg, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 925 days.

This patent is subject to a terminal disclaimer.

(21) Appl. No.: 11/376,011

(22) Filed: Mar. 15, 2006

(65) Prior Publication Data

US 2007/0217373 A1 Sep. 20, 2007

(51) Int. Cl.
H04L 12/56 (2006.01)
(52) U.S. Cl. ...................... 370/401; 370/252
(58) Field of Classification Search ........... None
See application file for complete search history.

(56) References Cited

U.S. PATENT DOCUMENTS

| | | | |
|---|---|---|---|
| 4,797,947 A | 1/1989 | Labedz | |
| 5,479,400 A | 12/1995 | Dilworth et al. | |
| 6,687,503 B1 | 2/2004 | Porter et al. | |
| 6,879,574 B2 | 4/2005 | Naghian et al. | |
| 7,321,571 B2 * | 1/2008 | Schnack et al. | 370/320 |
| 2001/0031646 A1 | 10/2001 | Williams | |
| 2002/0146980 A1 | 10/2002 | Solondz et al. | |
| 2002/0159409 A1 | 10/2002 | Wolfe et al. | |
| 2003/0035437 A1 | 2/2003 | Garahi et al. | |
| 2003/0091010 A1 | 5/2003 | Garahi et al. | |
| 2003/0091012 A1 | 5/2003 | Barker, Jr. et al. | |
| 2004/0001442 A1 | 1/2004 | Rayment et al. | |
| 2004/0095907 A1 | 5/2004 | Agee et al. | |
| 2004/0137924 A1 | 7/2004 | Herscovich et al. | |
| 2004/0156345 A1 | 8/2004 | Steer et al. | |
| 2004/0259563 A1 | 12/2004 | Morton et al. | |
| 2005/0074019 A1 | 4/2005 | Hanforth et al. | |
| 2005/0135242 A1 | 6/2005 | Larsen et al. | |

(Continued)

OTHER PUBLICATIONS

K. Chawla, X. Qiu, M. Clark, "Design of a Wireless Backhaul Network for Microcells," WCNC 1999, Sep. 21-24, 1999, p. 428-432.

(Continued)

Primary Examiner—Phuc Tran
(74) Attorney, Agent, or Firm—Lalita W. Pace (57) ABSTRACT

A communication system and a method of communicating data. A first backhaul site can be dynamically selected from a plurality of backhaul sites that are each configured to wirelessly communicate with an access point. A controller can dynamically configure a transmission parameter used to communicate a first backhaul data stream between the access point and the first backhaul site. The first backhaul data stream can be derived from a source data stream and can be wirelessly communicated between the access point and the first backhaul site. A second backhaul site also can be selected. A second backhaul data stream also can be derived from the source data stream and wirelessly communicated between the access point and the second backhaul site. The first and second backhaul data streams can be combined.

14 Claims, 5 Drawing Sheets

U.S. PATENT DOCUMENTS

| | | |
|---|---|---|
| 2005/0153725 A1 | 7/2005 | Naghian et al. |
| 2005/0192637 A1 | 9/2005 | Girouard et al. |
| 2005/0226185 A1* | 10/2005 | Tell et al. .................... 370/331 |
| 2006/0098609 A1* | 5/2006 | Henderson et al. .......... 370/338 |
| 2006/0099954 A1* | 5/2006 | Henderson et al. .......... 455/447 |
| 2007/0127417 A1* | 6/2007 | Kalika ........................ 370/338 |
| 2007/0218910 A1* | 9/2007 | Hill et al. .................... 455/445 |

OTHER PUBLICATIONS

Copenheaver, Blain R: The International Search Report and The Written Opinion of the International Searching Authority or the Declaration, completed Nov. 14, 2007, mailed Jan. 10, 2008.

* cited by examiner

DYNAMIC WIRELESS BACKHAUL

BACKGROUND OF THE INVENTION

1. Field of the Invention

The present invention generally relates to wireless communication systems and, more particularly, to implementation of wireless backhauls.

2. Background of the Invention

Contemporary wireless communication systems often include one or more access points communicatively linked to backhaul sites to provide a communication path between a communication device and a communications network. Oftentimes an access point will communicate with a backhaul site using a wireless backhaul. Use of the wireless backhaul eliminates the need to install wire or fiber optic cables between the access point and the communications network, thereby reducing network installation and maintenance costs.

Although it is desirable that wireless backhauls be very reliable, this is not always possible. Adverse propagation effects, such as those due to adverse weather conditions and electromagnetic interference, oftentimes degrade signal characteristics. In addition, co-channel interference, for example interference caused by groundlink communications that also may be supported on an access point or backhaul site, can contribute to signal degradation.

SUMMARY OF THE INVENTION

The present invention relates to a method of communicating data. The method can include dynamically selecting a first backhaul site from a plurality of backhaul sites that are each configured to wirelessly communicate with a particular access point. At least one transmission parameter used to communicate a first backhaul data stream between the access point and the first backhaul site can be dynamically configured.

In one aspect of the invention, at least a second backhaul site also can be selected from the plurality of backhaul sites. The first backhaul data stream can be derived from a source data stream and can be wirelessly communicated between the access point and the first backhaul site. A second backhaul data stream also can be derived from the source data stream and wirelessly communicated between the access point and the second backhaul site. The first backhaul data stream can be combined with the second backhaul data stream.

The present invention also relates to a communication system. The communication system can include an access point and a first backhaul site configured to wirelessly communicate with the access point. The communication system further can include a controller that dynamically configures at least one transmission characteristic of a backhaul data stream communicated between the access point and the first backhaul site.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The inventive arrangements disclosed herein relate to dynamic backhaul configuration in a communication system that includes an access point and one or more backhaul sites with which the access point wirelessly communicates. For example, characteristics of a backhaul signal transmission can be dynamically controlled to provide optimum signal quality while minimizing use of network bandwidth. In addition, transmission of a source data stream can be dynamically allocated to one or more spatially diverse backhaul channels. Data received over the various backhaul channels can be combined to generate a replica of the source data stream. Transmitting the source data stream in this manner provides greater immunity to noise and interference in comparison to transmitting the source data stream over a backhaul channel in a conventional manner.

Figure 1:
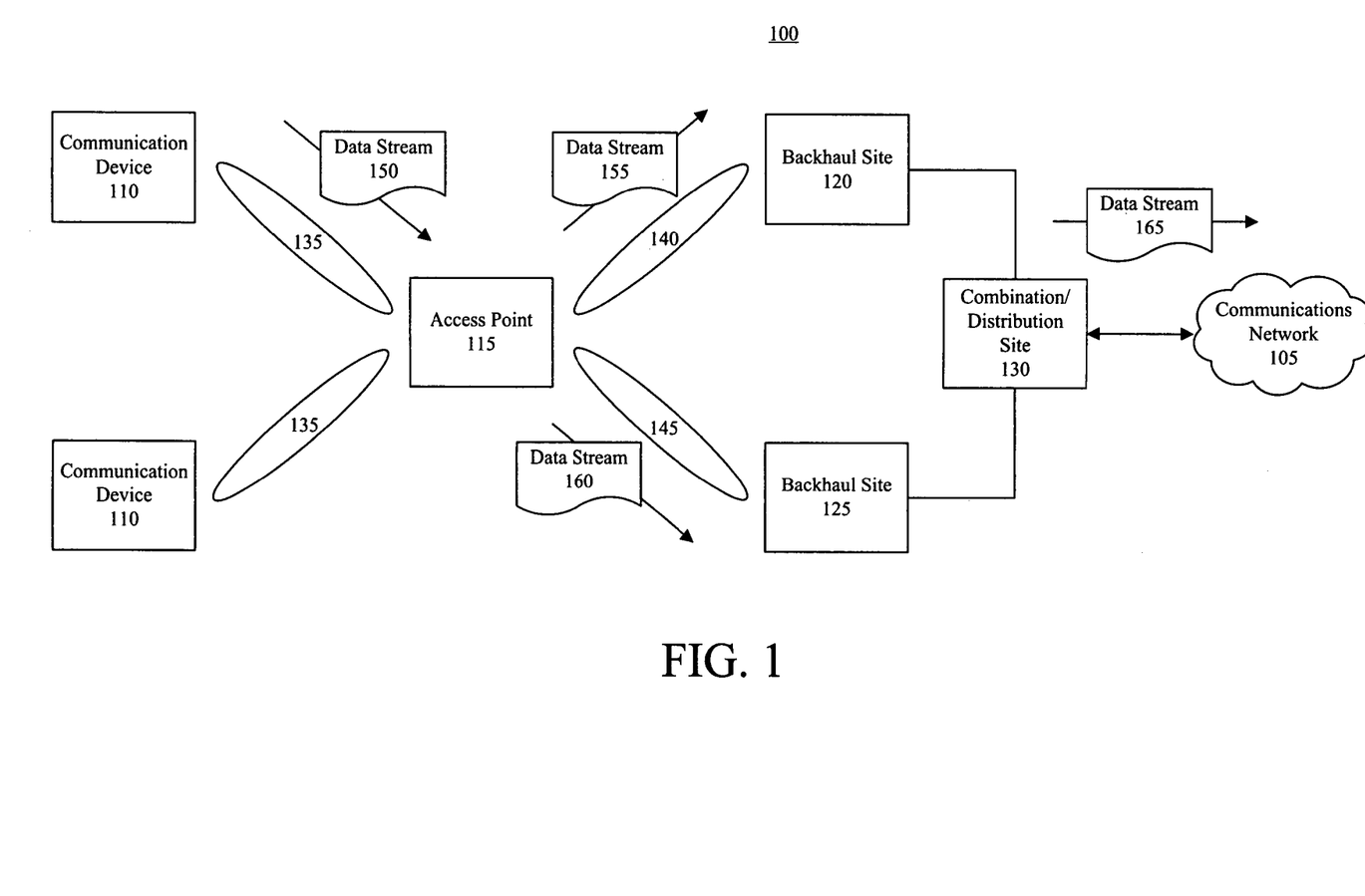
FIG. 1 depicts a wireless communication system that is useful for understanding the present invention.

FIG. 1 depicts a communication system 100 that is useful for understanding the present invention. The communication system 100 can communicatively link one or more communication devices 110 to a communications network 105. The communication system 100 can include at least one access point 115, a plurality of geographically separated backhaul sites 120, 125, and a combination/distribution site 130.

The access point 115 can communicate with the communication devices 110 via a wired connection or via groundlinks 135. As used herein, a "groundlink" is a wireless communication link between a network infrastructure node and a wireless communication device that is not part of the network infrastructure. For example, the communication devices 110 can be mobile telephones, mobile computers, personal digital assistants (PDAs), network appliances, or any other communication devices which are not part of the network infrastructure.

The access point 115 can communicate with the plurality of backhaul sites 120, 125 via respective wireless backhaul channels 140, 145. As used herein, a "backhaul channel" is a communication link between two network infrastructure nodes. Although two backhaul sites 120, 125 and two backhaul channels 140, 145 are depicted, the invention is not so limited and any number of backhaul sites can be configured to communicate with the access point 115. In this regard, any number of backhaul channels can be implemented for communicating with each of the backhaul sites 120, 125. Further, in addition to supporting backhaul communications, one or more of the backhaul sites 120, 125 can be configured with access point functionality to support groundlink communications directly with communication devices 110.

The spatial diversity of the geographically separated backhaul sites 120, 125 can be utilized to spatially diversify the backhaul channels 140, 145. In one arrangement, known beam forming techniques can be used to transmit RF signals over the backhaul channels 140, 145. Accordingly, each of the backhaul channels 140, 145 can operate in the same frequency spectrum, thereby conserving network bandwidth. Moreover, the backhaul channels 140, 145 also can operate in the same frequency spectrum used for the groundlinks 135, thus further conserving network bandwidth. Nonetheless, each backhaul channel also may operate in an exclusively dedicated frequency spectrum. Furthermore, a variety of multiple access modulation techniques can be implemented for the various backhaul channels to achieve signal separation. Examples of suitable modulation techniques are frequency division multiple access (FDMA), time division multiple access (TDMA), code division multiple access (CDMA), wideband code division multiple access (WCDMA), orthogonal frequency division multiple access (OFDMA), and the like.

In operation, the communication system 100 can dynamically configure the manner in which backhaul communications are used to propagate data through the communications network 100. The dynamic configuration can be performed by a controller contained in the access point 115, a controller contained in the combination/distribution site 130, and/or any other controller(s) associated with the communications network 100. For example, the dynamic configuration can be performed by a base station controller (BSC). Regardless of where the system configuration occurs, suitable control signals for implementing the selected configuration can be provided to the access point 115, backhaul sites 120, 125 and/or the combination/distribution site 130.

In response to the communication device 110 propagating a source data stream 150 to the access point 115, one or more backhaul sites 120, 125 can be dynamically selected for receiving a backhaul data stream, such as the data stream 155 or the data stream 160. For example, the communication system 100 can evaluate measured or determined network parameters to select one or more of the backhaul channels 140, 145 over which to transmit a backhaul data stream 155 and/or the backhaul data stream 160. The communication system 100 can, for instance, estimate the reliability of each of the backhaul channels 140, 145 by measuring receive signal parameters at each of the backhaul sites 120, 125. Examples of such receive signal parameters are signal strength, bit error rate, signal to interference ratio and signal to noise ratio. The communication system 100 also can measure or determine other operational aspects of the system 100. For example, backhaul loading on a particular backhaul site can be determined. If the backhaul site is also operating as an access point, groundlink loading also can be determined. Still, other signal parameters or aspects of system operation can be measured or determined, and the invention is not limited in this regard.

In another aspect of the invention, the backhaul sites 120, 125 that are dynamically selected can be those backhaul sites that minimize the number of serial backhaul links between the access point 115 and the node of the communications network 105 where the source data stream 150 is to be communicated. For example, a central controller (not shown) can monitor the topology of the communications network 105 and indicate to the access point 115 which backhaul sites 120, 125 are preferable to use to communicate the backhaul data stream(s) 155, 160. The controller can provide such indication based on a distributed protocol based approach that leverages adjacency of infrastructure sites. One example of such a protocol is the Open Shortest Path First (OSPF) protocol. The controller can forward updated indications to the access point 115 in response to changes in network topology.

In one arrangement, the access point 115 can communicate a first portion of the source data stream 150 to the first backhaul site 120. The first portion of the source data stream 150 can be transmitted as the first backhaul data stream 155. A second portion of the source data stream 150 can be transmitted to the second backhaul site 125 as the second backhaul data stream 160. Accordingly, each of the backhaul data streams 155, 160 can be derived from the source data stream 150.

The respective data streams 155, 160 can be communicated from the backhaul sites 120, 125 to the combination/distribution site 130 in a suitable manner. The combination/distribution site 130 can combine, or merge, the data streams 155, 160 to generate a data stream 165 that replicates the source data stream 150. The replicated data stream 165 can be propagated from the combination/distribution site 130 via the communications network 105.

The first and second backhaul data streams 155, 160 can be approximately equal in size, or the source data stream 150 can be allocated disproportionably to the first and second backhaul data streams 155, 160. For example, if the second backhaul site 125 currently is carrying a greater signal load (e.g. backhaul signal load and/or groundlink signal load) than the first backhaul site 120, the source data stream 150 can be allocated such that the first backhaul data stream 155 carries more data than the second backhaul data stream 160. If the second backhaul site 125 is currently at maximum capacity, the entire source data stream 150 can be allocated to the first backhaul data stream 155.

Data pertaining to the loading of the respective backhaul sites 120, 125 can be communicated to the appropriate controller in any suitable manner. For instance, in response to receiving a signal containing data from the access point 115, each of the backhaul sites 120, 125 can be configured to send a response to the access point 115 that indicates the amount of bandwidth that is available for use by the access point 115 over the respective backhaul channels 140, 145. The available bandwidth can be all unused bandwidth of a respective backhaul site 120, 125, or a portion of the bandwidth. The available bandwidth of each of the backhaul sites 120, 125 also can be periodically communicated to the access point 115, for example in a control signal.

In another arrangement, the source data stream 150 can be directed to the backhaul site that has greater visibility to the access point 115, is experiencing better signal reception, and/or is experiencing the least interference. For instance, if the second backhaul site 125 has greater visibility to the access point 115 than the first backhaul site 120, the entire source data stream 150 can be allocated to the second backhaul data stream 160. The visibility from each of the backhaul sites 120, 125 to the access point 115 can be at least partially dependent on changing environmental conditions, for instance weather, pollution, etc., and can be determined by evaluating measured receive signal parameters (e.g. signal strength, bit error rate, signal to interference ratio and/or signal to noise ratio). The visibility also can be determined in any other suitable manner and the invention is not limited in this regard.

Each of the backhaul data streams 155, 160 also can contain data sets that are substantially identical (hereinafter "identical", although the data sets may contain differences due to data errors and/or adverse propagation effects). For example, each of the backhaul data streams 155, 160 can include the entire source data stream 150.

In another arrangement, only a portion of the data contained in the source data stream 150 may be duplicated in two or more of the backhaul data streams 155, 160. For example, the backhaul data stream 155 can comprise the first two-thirds of the source data stream 150 and the backhaul data stream 160 can comprise the second two-thirds of the source data stream 150. In this example, the middle one-third of the source data stream 150 is included in both backhaul data streams 155, 160.

Soft or hard combining can be used to improve data reliability using multiple sets of identical data. Soft combining of the identical data can be performed by max-ratio combining demodulator outputs, adding log-likelihood ratios (LLRs) created from demodulator outputs, or performing any other suitable soft combining technique. For example, if both data streams contain a '0' bit corresponding to the fifth bit of the source data stream 150, the demodulator may produce a LLR of 1.2 from the first data stream and a LLR of −0.1 from the second data stream. Soft combining by adding the LLRs from the streams produces a LLR of 1.1. Assuming a LLR greater than zero corresponds to a '0' bit, the fifth bit generated for the replicated data stream 165 would be '0', which matches the fifth bit of the source data stream 150. Soft combining in this manner can correct data errors and improve signal reliability.

Identical data also can be hard combined when producing the replicated data stream 165 from the backhaul data streams 155, 160. In one arrangement, hard combining can be performed in a manner that requires identical data to appear three or more times within the plurality of backhaul data streams 155, 160. In such an arrangement, one or more additional backhaul data streams (not shown) can be propagated to another backhaul site (not shown). Alternatively, one or more of the backhaul data streams 155, 160 can include at least one duplicate set of data. A decision algorithm can be implemented that chooses a particular bit based on a majority decision. Continuing the example above, if the fifth bit of the source data stream 150 occurred as '0' in two sets of data and as '1' in a third set of data, the majority vote of the three bits '0', '0', '1' (such as from hard-sliced LLRs 1.1, 0.5 and −0.1) would be '0'. Hard combining in this manner also can correct data errors and improve signal reliability.

The backhaul data streams 155, 160 also can be combined in any other suitable manner and the invention is not limited in this regard. For example, sequence selection combining may be applied to the backhaul data streams in order to select the backhaul data stream 155, 160 that can produce the replicated data stream 165 in a manner that most reliably replicates the source data stream 150.

As used herein, the term "sequence selection" means to select one of two or more data sets such that the data set is selected which appears to have fewer data errors. A greater emphasis can be placed on data received in a higher quality signal in comparison to the emphasis that is placed on data received in a relatively lower quality signal. For example, a qualifier can be assigned to each of the backhaul data streams 155, 160. The qualifiers can be based, at least in part, on estimated number of bit errors, signal strength, bit error rate, signal to interference ratio, signal to noise ratio and/or any other signal parameter that can correlate to the quality of a signal. To determine the emphasis to be placed on each of the respective data streams 155, 160, the qualifier assigned to each of the backhaul data streams 155, 160 can be evaluated with respect to the qualifiers assigned to the other backhaul data stream(s). Such determination can be performed by the controller associated with the combination/distribution site 130 when the access point 115 is transmitting the backhaul data streams 155, 160.

In another arrangement, qualifiers can be assigned to portions of the backhaul data streams 155, 160. For example, qualifiers can be assigned to each packet, frame, group of bits, group of packets or frames, or any other portion of the backhaul data streams 155, 160 that may be defined. To determine the emphasis to be placed on the respective portions during the sequence selection combining process, the qualifiers for portions of each of the backhaul data streams 155, 160 can be evaluated against qualifiers for corresponding portions of the other backhaul data streams 155, 160. Again, the determination can be performed by the controller associated with the combination/distribution site 130 if the backhaul sites 120, 125 are receiving the backhaul data streams 155, 160.

Regardless of the number of backhaul channels that are used to propagate backhaul data, the inventive arrangements also relate to dynamic selection of transmission parameters for the backhaul data streams 155, 160. Such signal transmission parameters can include, for instance, transmit power, the manner in which the data is encoded into a backhaul data stream 155, 160, a modulation scheme, a protocol used to transmit the backhaul data stream 155, 160, and/or any other parameter that can affect the quality of data stream transmission. Still, other transmission parameters can be adjusted to insure integrity of the data stream while maximizing use of available network bandwidth. In order to select the optimum transmission parameters, the receive signal parameters measured at the backhaul site(s) 120, 125 can be evaluated.

For example, if analysis of recent signals received by the backhaul site 120 indicates an insignificant bit error rate and low signal to noise ratio, data can be transmitted in relatively large data blocks so that fewer ACKs/NAKs are required to be transmitted. Also, a modulation scheme and/or transmission protocol can be selected that implements a relatively high level of data encryption. For example, access point 115 can transmit the backhaul data stream 155 using 64 quadrature amplitude modulation (QAM) as opposed to 16 QAM.

When signal propagation characteristics degrade over a backhaul channel 140, 145, or interference levels change, signal transmission parameters can be adjusted to compensate. For instance, if the propagation characteristics of the first backhaul channel 140 degrade due to weather and/or interference, the access point 115 can increase signal transmit power, change the modulation (e.g. change modulation from 64 QAM to 16 QAM) and/or change the protocol used to transmit the backhaul data stream.

Another transmission parameter that can be dynamically adjusted is data redundancy. Indeed, whether to implement data redundancy, as well as the rate of redundancy coding, can be dynamically selectable. For example, if there is an insignificant bit error rate and low signal to noise ratio, data can be encoded into the backhaul data stream 155 with relatively little or no data redundancy or data error correction. If, however, signal propagation characteristics are degraded, the backhaul data streams 155, 160 can be encoded to include redundancy or parity bits for more reliable backhaul transmission. Methods of including redundancy bits in the backhaul data streams include, but are not limited to, convolutional encoding, Reed-Solomon encoding, turbo encoding, fountain encoding, or low-density parity check encoding.

If the backhaul data streams 155, 160 include redundancy or parity bits, sequence selection or combining operations may be performed after the removal of redundancy bits through decoding. For example, soft combining after decoding can occur on soft decoder outputs or LLRs. The decoding operation can be matched to the encoding operation (e.g., a turbo decoder if a turbo encoder was used to include redundancy bits), and may be implemented by hard-decision, erasure, soft-decision or any other decoding process. Decoding processes are known in the art.

In an alternate arrangement, sequence selection or combining of the backhaul data streams 155, 160 can occur before the removal of redundancy bits. For example, if the backhaul data streams 155, 160 are soft combined, such combining can occur on soft demodulator outputs or LLRs. Combining the backhaul data streams 155, 160 prior to removal of the redundancy bits can be advantageous when the backhaul data streams 155, 160 are merged to form a single, typically larger, codeword that may be decoded to produce the replicated data stream 165. By way of example, such backhaul data streams can be generated from the source data stream 150 when the source data stream 150 has been convolutionally encoded. For instance, the first portion of the source data stream 150 may correspond to a subset of bits selected from the source data stream 150 via a first puncturing pattern, and the second portion may correspond to a subset of bits selected from the source data stream 150 via a second puncturing pattern.

Figure 2:
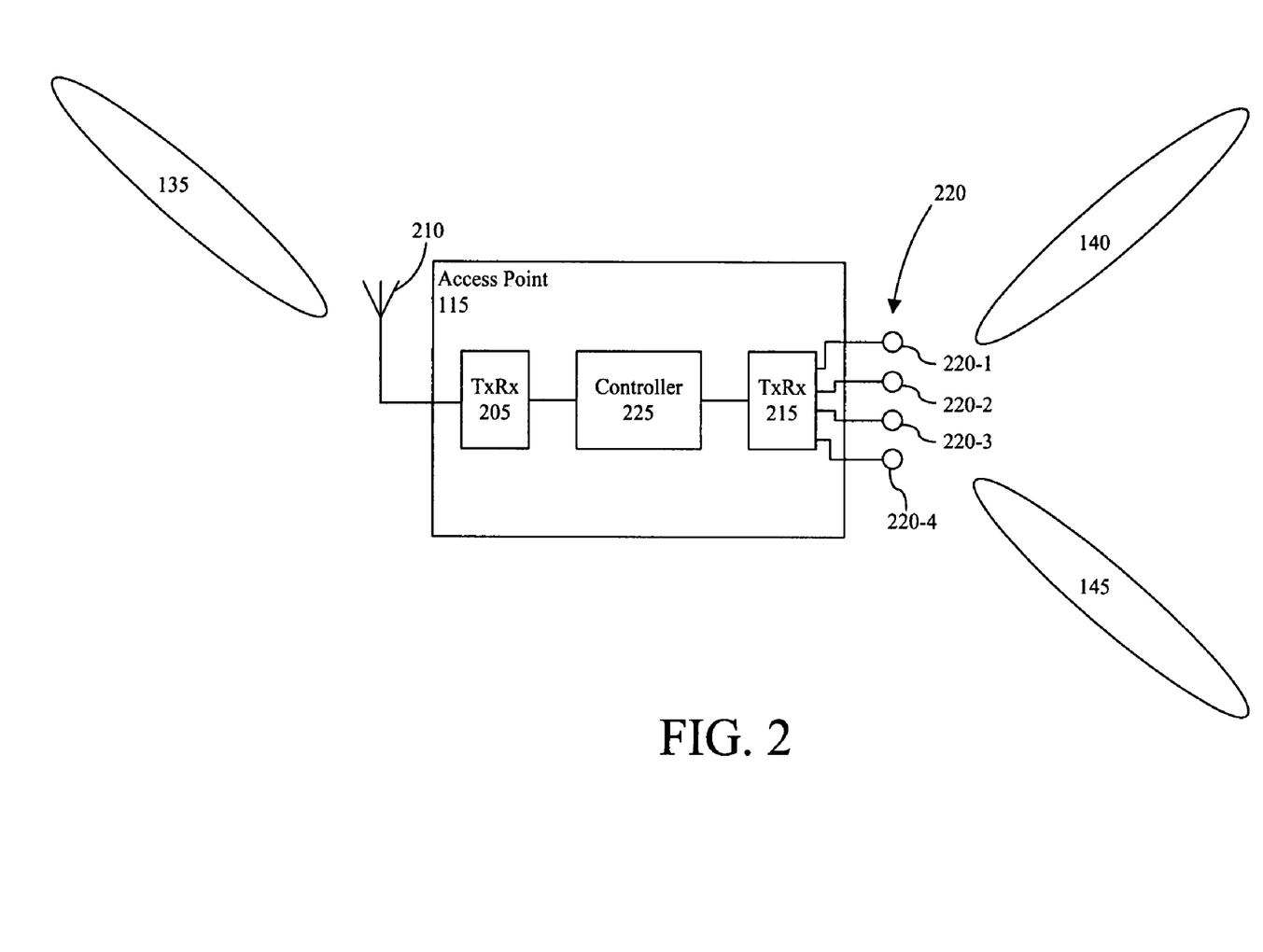
FIG. 2 depicts an access point that is useful for understanding the present invention.

FIG. 2 depicts an example of the access point 115 that is useful for understanding the invention. The access point 115 can include at least one transceiver 205 to support communications over one or more groundlinks, for instance groundlink 135. The transceiver 205 can be, for example, a software defined radio. Software defined radios are known to the skilled artisan. The transceiver 205 can support Global System for Mobile Communication (GSM) wireless communications, frequency division multiple access (FDMA), time division multiple access (TDMA), code division multiple access (CDMA), wideband code division multiple access (WCDMA), orthogonal frequency division multiple access (OFDMA), any of the IEEE 802 wireless network protocols (e.g. 802.11a/b/g/i, 802.15, 802.16, 802.20), Wi-Fi Protected Access (WPA), WPA2, or any other wireless communications protocol implemented by the communications access point 115.

The access point also can include an antenna 210 operatively connected to the transceiver 205 to support groundlink communications. The antenna 210 can be an omni-directional antenna or a phased array (i.e. smart antenna). As known to those skilled in the art, a phased array can be used by an RF device to wirelessly communicate over a plurality of spatially diverse communication channels.

In another arrangement the access point 115 can include a communications port (not shown) for communicating with the communication device over a wired communications link. The communications port can be a network adapter, a serial communications port, a parallel communications port, or any other suitable port that supports wired communications.

The access point 115 also can include at least one backhaul transceiver 215 to support backhaul communications with the backhaul sites. The backhaul transceiver 215 can be, for example, a software defined radio. In the arrangement shown, a single multi-channel backhaul transceiver 215 can be implemented to support communication on multiple backhaul channels 140, 145. In an alternate arrangement, the access point 115 can include a first transceiver to support communications on the first backhaul channel 140 and a second transceiver to support communications on the second backhaul channel 145. In yet another arrangement, a single transceiver can serve the function of the transceiver 205 and the backhaul transceiver 215. Still, any number of transceivers can be included in the access point 115 and the invention is not limited in this regard.

To facilitate communication over the spatially diverse backhaul channels 140, 145, the access point 115 can include a phased array 220. The phased array 220 can support communications over the first backhaul channel 140, the second backhaul channel 145, and/or any additional backhaul channels that the phased array 220 may be tasked with supporting. The phased array 220 can both beam form signals being transmitted to the backhaul sites and focus reception onto signals being received from the backhaul sites. In one arrangement, the phased array 220 also can support groundlink communications. In such an arrangement, the access point 115 need not include the antenna 210.

The access point 115 can include a controller 225 to dynamically control RF signals applied by the backhaul transceiver 215 to the phased array 220 and to control processing of signals received by the backhaul transceiver 215. For example, in the transmit mode, individual RF signals can be applied to each of the respective array elements 220-1, 220-2, 220-3, 220-4 using known techniques to control dispersion and lobe characteristics of each of the backhaul channels 140, 145. In the receive mode, RF signals received by each of the respective array elements 220-1, 220-2, 220-3, 220-4 can be processed using known techniques to isolate signals received over the respective backhaul channels 140, 145. These control processes can minimize interference between the backhaul channels 140, 145, as well as minimize interference from the groundlinks and any other sources of RF interference.

In another arrangement, the access point 115 can include a directional antenna (not shown) for each wireless backhaul channel 140, 145. For example, a first directional antenna can be used to support communications over the first backhaul channel 140 and a second directional antenna can be used to support communications over the second backhaul channel 145. Each of the directional antennas can be selected to achieve dispersion and lobe characteristics which minimize interference between the backhaul channels 140, 145 and minimize interference from the groundlinks and other interference sources. The controller 225 can dynamically control RF signals applied by the transceivers to the respective directional antennas and process RF signals received by the directional antennas.

Figure 3:
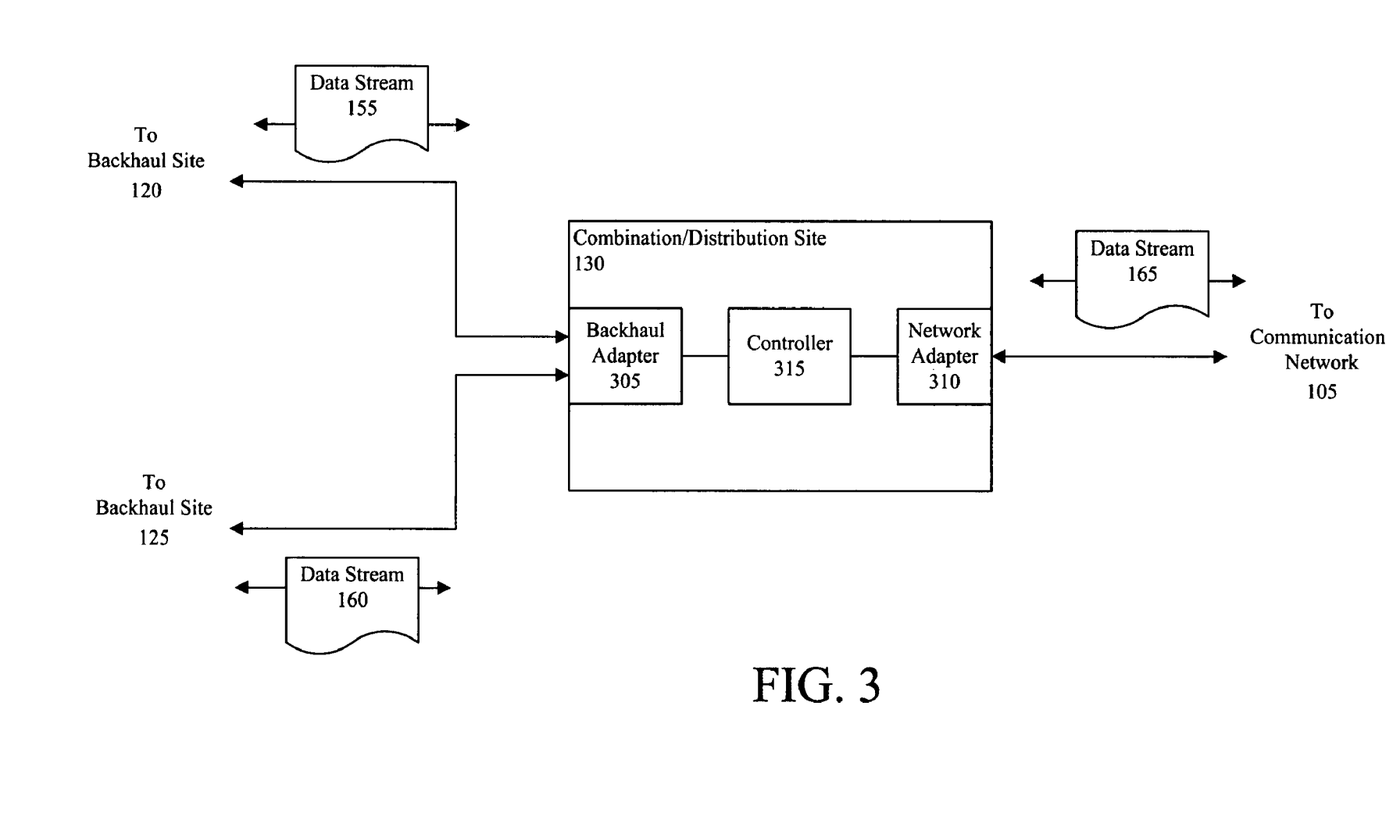
FIG. 3 depicts a combiner/distribution site that is useful for understanding the present invention.

FIG. 3 depicts an example of the combination/distribution site 130 that is useful for understanding the invention. The combination/distribution site 130 can be a network element that is suitable for combining the backhaul data streams 155, 160 to generate a data stream 165. The combination/distribution site 130 can be located at a backhaul site, a network site, or elsewhere.

The combination/distribution site 130 can include a backhaul adapter 305 for communicating with the respective backhaul sites 120, 125. In one arrangement, the backhaul adapter 305 can communicate with the backhaul sites 120, 125 via wired communication links. In another arrangement, the backhaul adapter 305 can communicate with the backhaul sites 120, 125 via wireless communication links. For example, the backhaul adapter 305 can include a transceiver and the combination/distribution site 130 can include one or more antennas or phased arrays. In yet another arrangement, both wired and wireless communication links can be implemented. For instance, the combination/distribution site 130 can communicate with the first backhaul site 120 via a wired communication link and communicate with the second backhaul site 125 via a wireless communication link.

The combination/distribution site 130 can include a network adapter 310 for communicating via the communications network 105. The network adapter 310 can be a wired or wireless network adapter suitable for communicating in accordance with the communications protocol implemented by the communications network 105. The combination/distribution site 130 also can include a controller 315 that processes data received by the combination/distribution site 130 and provides appropriate control signals to the backhaul adapter 305 and the network adapter 310.

Figure 4:
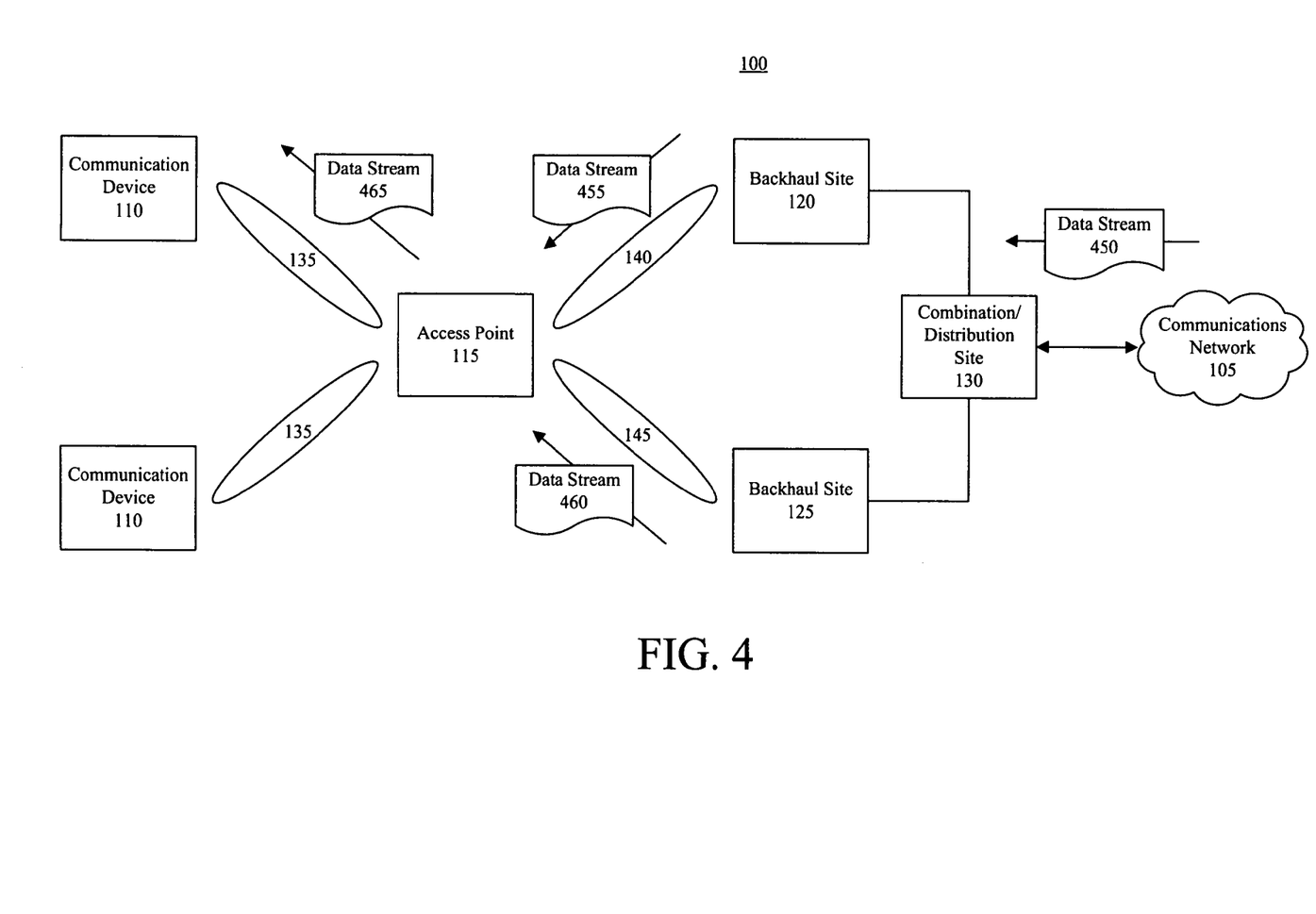
FIG. 4 depicts another arrangement of the wireless communication system of FIG. 1.

Referring to FIG. 4, just as the communication system 100 can dynamically configure backhaul communications for propagation of a data stream received from a communication device 110, the communication system 100 also can dynamically configure backhaul communications for a source data stream 450 that is directed to the communication device 110. For example, the combination/distribution site 130 can receive the source data stream 450 from the communications network 105 and dynamically select one or more of the backhaul sites 120, 125 from which to communicate the source data stream 450. The source data stream 450 can be transmitted from the selected backhaul site(s) 120, 125 to the access point 115 in one or more data streams 455, 460. The access point 115 then can communicate a data stream 465 replicated from the data stream 455 and/or the data stream 460 to a selected communication device 110, for example over the groundlink 135.

Dynamic selection of backhaul sites 120, 125 and use of the backhaul channels 140, 145 can be substantially equivalent to those processes described with respect to FIG. 1. For example, each of the backhaul sites 120, 125 can be configured to send a response to the combination/distribution site 130 that indicates the amount of bandwidth that is available for use by the combination/distribution site 130 over the respective backhaul channels 140, 145. The available bandwidth of each of the backhaul sites 120, 125 also can be periodically communicated to the combination/distribution site 130, for example in a control signal.

In one arrangement, the source data stream 450 can be directed to the backhaul site that has greater visibility to the access point 115, and/or the backhaul site from which the access point 115 is experiencing a better received signal, and/or is experiencing least interference. In another arrangement, each of the data streams 455, 460 can include a respective portion of the data stream 450, or each of the data streams 455, 460 can include the entire data stream 450. In yet another arrangement, backhaul sites 120, 125 can be selected to minimize the number of serial backhaul links that are used to communicate the source data stream 450 to the access point 115.

When the backhaul sites 120, 125 are transmitting to the access point 115, the configuration of the communication system 100 need not be identical nor symmetrical relative to the configuration when the access point 115 is transmitting to the backhaul sites 120, 125. For example, when receiving data, the access point 115 may communicate with one or more backhaul sites that are different than the backhaul sites with which the access point 115 communicates in the transmit direction. Moreover, a combination/distribution site that is different than the combination/distribution site 130 can be used to distribute data being transmitted from backhaul sites to the access point 115.

In arrangements in which multiple backhaul channels 140, 145 are used, the access point 115 can combine the data streams 455, 460 to generate the replicated data stream 465. For example, when the access point 115 is receiving and soft combining the backhaul data streams 455, 460, the controller associated with the access point 115 can determine the emphasis to be placed on each of the respective data stream 455, 460, or portions of the respective data streams 455, 460, based on assigned qualifiers.

Further, dynamic control of backhaul site signal transmission characteristics also can be substantially equivalent to control of the access point's transmission characteristics described with respect to FIG. 1. For instance, the transmit power, the manner in which the data is encoded into the backhaul data stream 455, 460, the modulation scheme, and/or the protocol used to transmit the backhaul data streams 455, 460 from the backhaul sites 120, 125 can be dynamically controlled.

Figure 5:
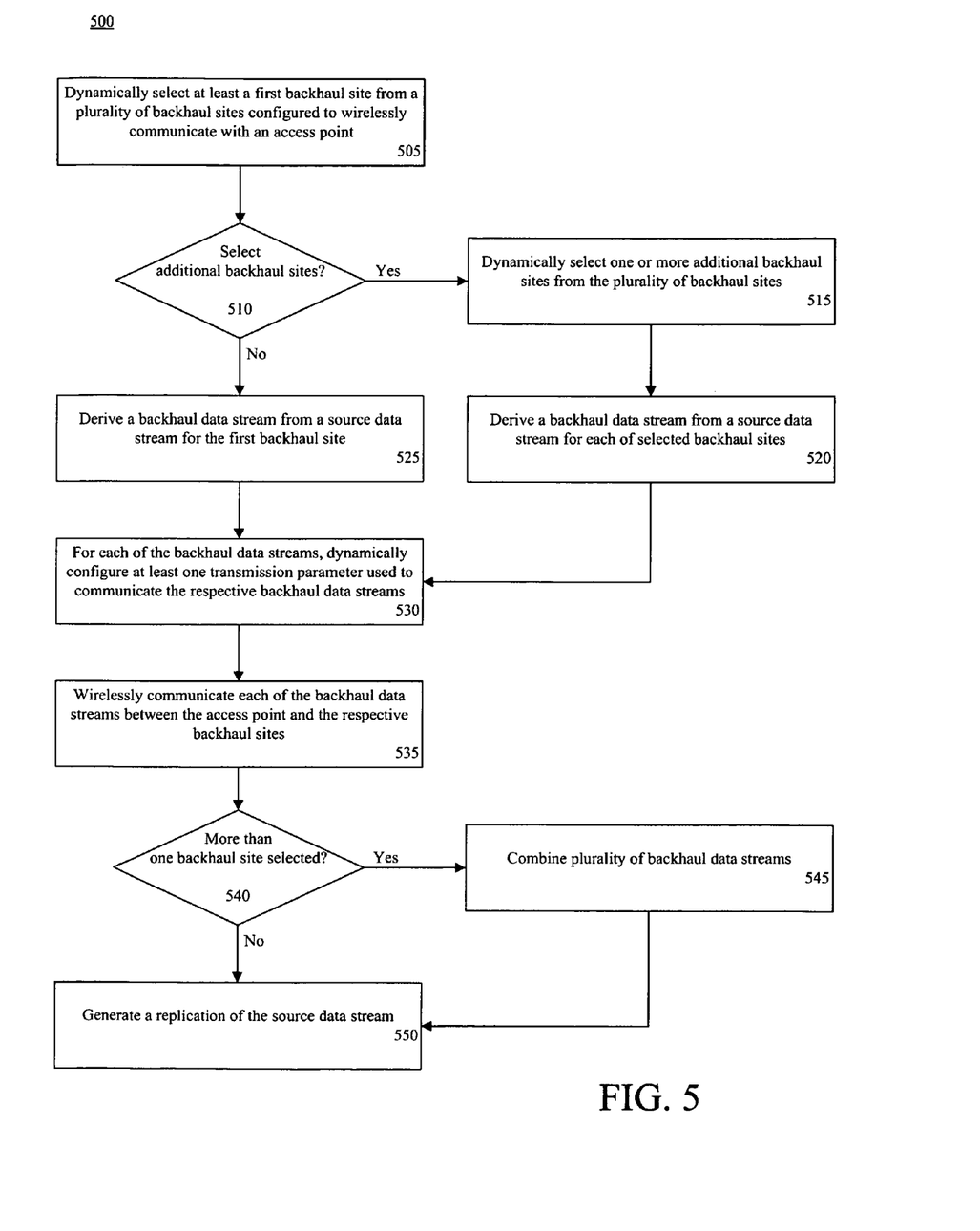
FIG. 5 depicts a flowchart presenting a communication method that is useful for understanding the present invention.

FIG. 5 depicts a flowchart presenting a communication method 500 that is useful for understanding the present invention. Beginning at step 505, a first backhaul site can be dynamically selected from a plurality of backhaul sites configured to wirelessly communicate with an access point. At decision box 510, a determination can be made whether to select additional backhaul sites. For instance, if the first backhaul site is heavily loaded, or signals transmitted to the first backhaul site experience adverse propagation effects, at least a second backhaul site can be selected, as shown in step 515. Continuing to step 520, a backhaul data stream can be derived from a source data stream for each of the selected backhaul sites. As noted, the backhaul data streams each can contain the entire data stream propagated in the source data stream, or each of the data streams can contain a portion of the data stream. Referring to step 525, if a single backhaul site has been selected, a backhaul data stream can be derived for the first backhaul site. This data stream can include the entire source data stream.

Referring to step 530, for each of the backhaul data streams, at least one transmission parameter used to communicate the respective backhaul data streams can be dynamically configured. The transmission parameter can be, for example, a transmit power, a data encoding scheme, a modulation scheme and/or a transmission protocol. Proceeding to step 535, the backhaul data streams can be communicated to the respective backhaul sites.

Referring to decision box 540 and step 545, if more than one backhaul site has been selected, the respective backhaul data streams can be combined. As noted, the data streams can be combined in any suitable manner. At step 550, a replication of the source data stream can be generated. The replicated data stream can be propagated to network infrastructure or a communication device in any suitable manner.

The term "software" and/or variants thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of communicating data comprising:
   from a plurality of backhaul sites that are each configured to wirelessly communicate with a particular access point, dynamically selecting at least a first backhaul site;
   dynamically configuring at least one transmission parameter used to communicate a first backhaul data stream between the access point and the first backhaul site, wherein the at least one transmission parameter is selected from a group consisting of a transmit power, a data encoding scheme, a modulation scheme, and a transmission protocol;
   dynamically selecting at least a second backhaul site;
   deriving the first backhaul data stream from a source data stream;
   deriving at least a second backhaul data stream from the source data stream;
   wirelessly communicating the first backhaul data stream between the access point and the first backhaul site;
   wirelessly communicating the second backhaul data stream between the access point and the second backhaul site; and
   combining the first backhaul data stream with the second backhaul data stream.

2. The method according to claim 1, wherein:
   deriving the first backhaul data stream comprises generating the first backhaul data stream such that the first backhaul data stream is equal to the source data stream;
   deriving the second backhaul data stream comprises generating the second backhaul data stream such that the second backhaul data stream is equal to the source data stream; and
   combining the first backhaul data stream with the second backhaul data stream comprises soft combining the first backhaul data stream with the second backhaul data stream to generate a data stream that replicates of the source data stream.

3. The method according to claim 2, further comprising assigning to at least a portion of each of the first backhaul data stream and the second backhaul data stream a signal qualifier that indicates an amount of emphases to place on each of the respective data streams.

4. The method according to claim 1, wherein:
   deriving the first backhaul data stream comprises generating the first backhaul data stream such that the first backhaul data stream is equal to a first portion of the source data stream;
   deriving the second backhaul data stream comprises generating the second backhaul data stream such that the second backhaul data stream is equal to a second portion of the source data stream; and
   combining the first backhaul data stream with the second backhaul data stream comprises merging the first backhaul data stream with the second backhaul data stream to generate a data stream that replicates the source data stream.

5. The method according to claim 4, further comprising dynamically selecting a size of the first backhaul data stream.

6. The method according to claim 1, wherein wirelessly communicating the first backhaul data stream comprises transmitting the first backhaul data stream in a frequency spectrum in which the access point communicates with a wireless communication device.

7. The method according to claim 6, wherein wirelessly communicating the second backhaul data stream comprises transmitting the second backhaul data stream in the frequency spectrum in which the access point communicates with the wireless communication device.

8. A communication system comprising:
   an access point;
   a first backhaul site configured to wirelessly communicate with the access point;
   a controller that dynamically configures at least one transmission characteristic of a backhaul data stream communicated between the access point and the first backhaul site, wherein the transmission characteristic is selected from a group consisting of a transmit power, a data encoding scheme, a modulation scheme, and a transmission protocol;
   at least a second backhaul site configured to wirelessly communicate with the access point; and
   a combination/distribution site communicatively linked to the first and second backhaul sites, the combination/distribution site combining a first backhaul data stream with a second backhaul data stream.

9. The communication system of claim 8, wherein:
   the first backhaul data stream is equal to the source data stream;
   the second backhaul data stream is equal to the source data stream; and
   the combination/distribution site soft combines the first backhaul data stream with the second backhaul data stream to generate a data stream that replicates the source data stream.

10. The communication system of claim 9, wherein the controller further assigns to at least a portion of each of the first backhaul data stream and the second backhaul data stream a signal qualifier that indicates an amount of emphases to place on each of the respective data streams.

11. The communication system of claim 8, wherein:
    the first backhaul data stream is equal to a first portion of the source data stream;
    the second backhaul data stream is equal to a second portion of the source data stream; and
    the combination/distribution site merges the first backhaul data stream with the second backhaul data stream to generate a data stream that replicates the source data stream.

12. The communication system of claim 11, wherein the controller dynamically selects a size of the first backhaul data stream.

13. The communication system of claim 8, wherein the access point wirelessly transmits the first backhaul data stream in a frequency spectrum in which the access point communicates with a wireless communication device.

14. The communication system of claim 13, wherein the access point wirelessly transmits the second backhaul data stream in the frequency spectrum in which the access point communicates with the wireless communication device.

* * * * *